United States Patent [19]

Morse et al.

[11] Patent Number: 5,054,657
[45] Date of Patent: Oct. 8, 1991

[54] SANITARY BULK FOOD DISPENSER WITH ROTARY CONE FEEDER

[76] Inventors: Hugh B. Morse, 680 Wildwood Dr., Watsonville, Calif. 95076; John V. Ciolino, 13558 Paseo Terrano St., Salinas, Calif. 93908

[21] Appl. No.: 559,339
[22] Filed: Jul. 30, 1990
[51] Int. Cl.⁵ .............................................. B67D 5/64
[52] U.S. Cl. .................... 222/162; 198/658; 222/167; 222/412
[58] Field of Search ............... 222/167, 169, 170, 172, 222/227, 236, 238, 239, 240, 241, 242, 356, 357, 358, 410, 411, 412, 413, 414, 424.5, 425, 445, 446, 449, 452, 517, 531, 533, 162; 198/658

[56] References Cited

U.S. PATENT DOCUMENTS

| 2,628,002 | 4/1952 | Peterson | 222/240 |
|---|---|---|---|
| 3,031,807 | 5/1962 | Bylsma et al. | 198/658 X |
| 3,979,026 | 9/1976 | Lee | 222/167 |
| 4,173,239 | 11/1979 | Reiche | 222/167 X |
| 4,790,457 | 12/1988 | Morse et al. | 222/556 X |
| 4,802,609 | 2/1989 | Morse et al. | 222/556 X |
| 4,878,603 | 11/1989 | Ikesue et al. | 222/167 |

FOREIGN PATENT DOCUMENTS

| 2631008 | 11/1989 | France | 198/658 |
|---|---|---|---|
| 1278311 | 11/1989 | Japan | 222/236 |
| 1423462 | 9/1988 | U.S.S.R. | 222/236 |

Primary Examiner—Michael S. Huppert
Assistant Examiner—Joseph A. Kaufman
Attorney, Agent, or Firm—Jeffrey A. Hall

[57] ABSTRACT

A dispenser for dispensing foodstuffs or other consumer products and the like comprises a base, a drive assembly having a drive handle, a container defining a chamber at least partially filled with foodstuffs or other products and a feed cone having an auger blade disposed therein and extending into the container when the feed cone and the container are operably linked. A measuring chamber and a dispenser chute are moveably mounted to the feed cone. The dispensing chute is retained in a normally closed position by a spring secured to the dispenser chute. When the drive handle is manually turned a measured quantity of food stuff or other consumer product is conveyed into the measuring chamber.

34 Claims, 7 Drawing Sheets

SANITARY BULK FOOD DISPENSER WITH ROTARY CONE FEEDER

BACKGROUND OF THE INVENTION

1. Field of Invention

This invention relates to sanitary dispensers of consumer products and more particularly to dispensers for foodstuffs and other dispensible products having a spiral auger blade conveyor.

2. Description of Prior Art

The bulk handling of various consumer products including snack foods and other foodstuffs in health and grocery stores is usually accomplished by use of open top containers and scoops. In particular, a customer will normally scoop out the desired quantity of a product and place it in a plastic or paper bag for weighing and price determination purposes. For example, snack foods of this type may include raisins, other types of dried fruit, malt balls, cookies, nuts, various candies and the like. Other dispensible products include hardware products and medical supplies, for example.

Conventional containers of this type are unsanitary and inconvenient since the foodstuff is exposed to ambient dirt, dust and vermin, and potential customer contamination, for example. Various dispensing apparatus have been proposed to alleviate the problems of sanitation. For example, U.S. Pat. Nos. 2,920,796 and 4,511,067 each disclose a dispenser that utilizes a paddle-wheel type of conveying member for dispensing measured quantities of foodstuffs. U.S. Pat. No. 2,550,248 discloses a dispenser that includes a reciprocal tray for effecting the dispensing function. U.S. Pat. No. 2,593,803 discloses another type of dispenser wherein a screw conveyor shaft is utilized to dispense finely divided products such as sugar or salt, into a receptacle that is emptied by tipping the dispenser. Applicant's prior patents, U.S. Pat. Nos. 4,790,457 and 4,802,609 each disclose a dispenser having an elongated rotary screw conveyor mounted therein.

Dispensing apparatus of the above type are relatively complex in construction and operation and may give rise to clogging and related problems. Each dispenser is normally constructed to dispense with a single type of foodstuff product and is not particularly adapted for dispensing various types of products having particle sizes ranging from sugar to dried fruit to hardware products. Further, many such dispensers fail to provide the customer with continuous visual inspection of the dispensed product and accurate measurement of the quantity of product being dispensed.

SUMMARY OF THE INVENTION

This invention overcomes the above, briefly described problems by providing a sanitary dispenser that is non-complex, easy to operate, adapted to accurately dispense foodstuffs or other products having a wide range of particle or product size, and is clog free. In addition, the dispenser is preferably transparent to permit the consumer to visually note the quantity of product being dispensed.

The sanitary dispenser of this invention comprises a base support and hand-operated drive assembly conformed to mount and receive a closed container defining a chamber adapted to be filled with a preselected quantity of foodstuffs, hardware items, medical supplies, or any type of particulate matter suitable for dispensing. A feed cone is detachably mounted to said container having an elongate spiral auger blade mounted therein. A removeable closed measuring chamber is mounted on the container for receiving a measured quantity of foodstuffs or other item to be dispensed.

Dispensing means are provided for dispensing the measured quantity of foodstuff or other matter from the measuring chamber.

BRIEF DESCRIPTION OF THE DRAWINGS

Other objects and advantages of this invention will become apparent from the following description and accompanying drawings wherein.

BEST MODE OF CARRYING OUT THE INVENTION

General Description

Figures 1, 2, 3:
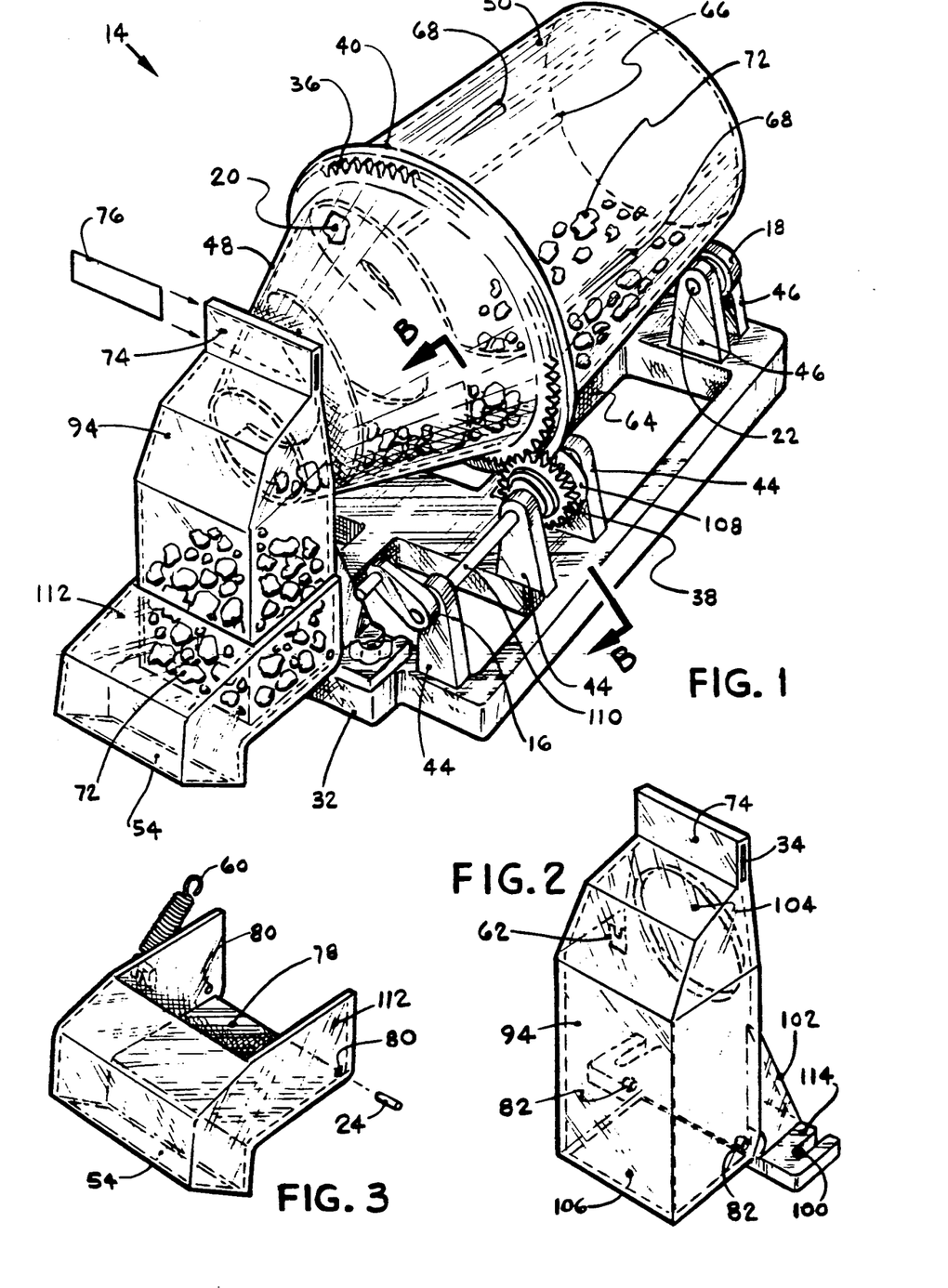
FIG. 1 shows a front perspective view of a sanitary dispenser according to the invention.
FIG. 2 shows a perspective view of a measuring chamber detached from the container according to the invention.
FIG. 3 shows a perspective view of a dispenser chute detached from the measuring chamber according to the invention.
Figure 4:
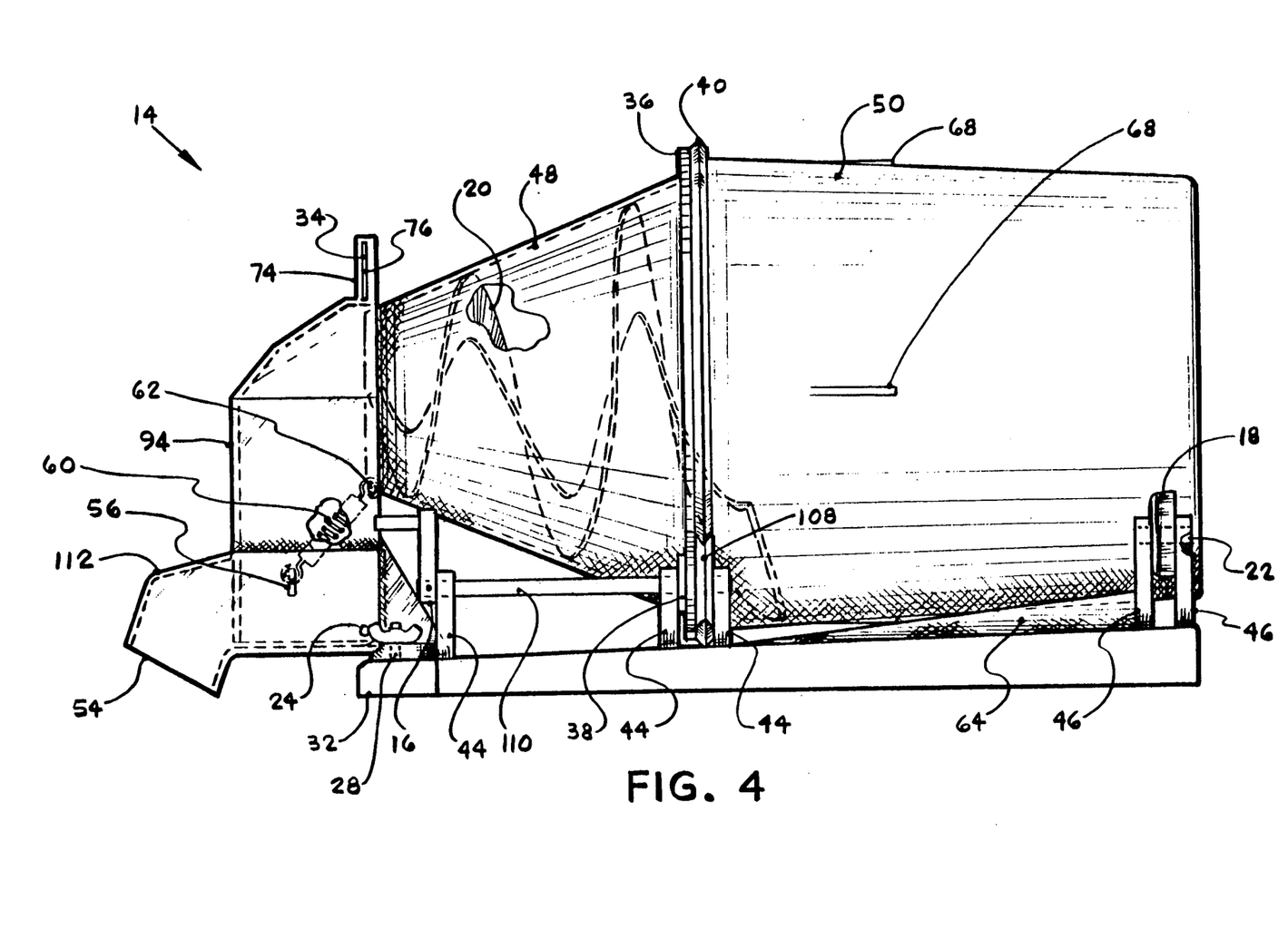
FIG. 4 shows an orthographic view, right side, of the sanitary dispenser.

FIG. 1 illustrates a transparent sanitary dispenser 14 comprising three modular subassemblies; a base support and drive assembly, a container and feed cone assembly, and a measuring chamber and dispenser chute assembly. Identical numerals depict corresponding constructions and components.

The dispenser 14 comprises a base 32 having hand operated drive assembly and support means to support and rotate a product container 50 and a feed cone 48. The container 50 defines a closed chamber therein adapted to be at least partially filled with a preselected quantity of foodstuffs or other items. A auger blade 20 within feed cone 48 facilitates the transport and removal of foodstuff within container 50 to an exit area of the feed cone when the container 50 and feed cone 48 are rotated. The measuring chamber and dump chute assembly is comprised of a measuring chamber 94, a dispenser chute 112, a spring 60, pivot pins 24 and a tag 76. The measuring chamber 94 has an entry opening 104 which closely mates with an exit end of feed cone 48. Measuring chamber 94 has an opening 106 which serves as an exit area for foodstuffs and the like. Opening 106 is normally closed by retaining floor 78 of dispenser chute 112. A spring 60 retains floor 78 in a closed position until dispenser chute 112 is pivoted downward by a consumer or store personnel. Foodstuffs or other products are then released into a waiting bag or other container.

In use, a consumer need only rotate drive handle 16 generally clockwise in FIG. 1 a selected number of full or partial turns to rotate container 50 and feed cone 48 to charge measuring chamber 94 with a measured quantity of product. Measuring indicia in the form of a marked and graduated tape or tag 76 may be used to visually indicate such measured quantity to the consumer. Product information tag 76 is used to show the name, price, and other customer oriented information. A horizontally disposed slot on measuring chamber 94 may be used to secure such tape or tag thereto. Measuring chamber 94 may also have graduated markings attached thereto so as to visually indicate volume of other quantitative data to the consumer.

Once the desired amount of product is situated in chamber 94 the consumer then pivots dispenser chute 112 downward to release product 72. Spring 60 returns dispenser chute 112 to a normally closed upward position upon release of dispenser chute 112. If more product 72 has been released than desired the consumer cannot easily return the now contaminated product to container 50. Therefore the remaining foodstuff or other items remain uncontaminated within container 50. Store personnel can replace container 50 with re-supplied products to dispenser 14 when desired. Sealing tapes, wires, or other locking devices may be used to secure container 50 and feed cone 48 together to prevent undesired tampering with products contained therein.

Detailed Description of a Preferred Embodiment

FIG. 1 shows a sanitary dispenser 14 according to the preferred embodiment of the invention. FIGS. 4, 5, 6, 7 and 9 show various views thereof. The dispenser 14 comprises a container 50 and a feed cone 48 which are secured together with locking tabs 86 and slots 84. An auger blade 20 is disposed circumferentially within feed cone 48. In the preferred embodiment auger blade 20 is spiral shaped. As shown in FIG. 1 spiral auger blade 20 extends from substantially exit opening 52 in feed cone 48 and terminates forwardly extending into container 50. The spiral auger blade is thus continuously exposed to the product contained in the container. The spiral configuration of auger blade 20 provides that the product will be conveyed gently without damage or undue binding. Base 32 having actuating means comprised of support wheels 18 and support bearing wheels 108 which support and rotate container 50 and feed cone 48 thereon. Bearing wheels 108 are rotatably linked to drive shaft 110 and drive handle 16 so that when drive handle 16 is rotated bearing wheels 108 drive ring gear 36 on feed cone 48 thereby rotating container 50 and feed cone 48. Entry opening in measuring chamber 94 is adapted to conform to exit opening 52 in feed cone 48 through which foodstuffs or other products 72 pass when container 50 and feed cone 48 are rotated. Exit opening 54 is normally closed by product retaining floor 78 of dispenser chute 112. Spring 60 secures floor 78 against measuring chamber 94 until dispenser chute 112 is pivoted downward permitting foodstuffs or other products to be released from measuring chamber 94 and into a bag, box, or other receptacle.

Container 50 has, in the preferred embodiment, a plurality of elongate internal ribs 66 and a plurality of external stacking tabs 68 operably integral with feed cone 48, spiral screw auger 20, exit opening 52, ring gear 36, ring bearing 40, locking slot 84, entry slot 92, entry end of spiral auger 88, and exit end 90 of auger 20, so that when rotated together about a longitudinal rotational axis, foodstuffs and other products are efficiently conveyed from container 50 through exit opening 90.

FIGS. 1, 4, 5, 8, and 9 show the longitudinal rotational axis is approximately horizontal as situated by support wheel 18 and bearing wheel 108. Ribs 66 effectively promote the dispensing and movement of product 72. Support wheels 18 and bearing wheels 108 are controlled by shafts 22, 42, and 110 in operable conjunction with shaft supports 44 and 46. Shaft supports 44 and 46 are mounted on or integral with base 32 in the preferred embodiment.

Figure 8:
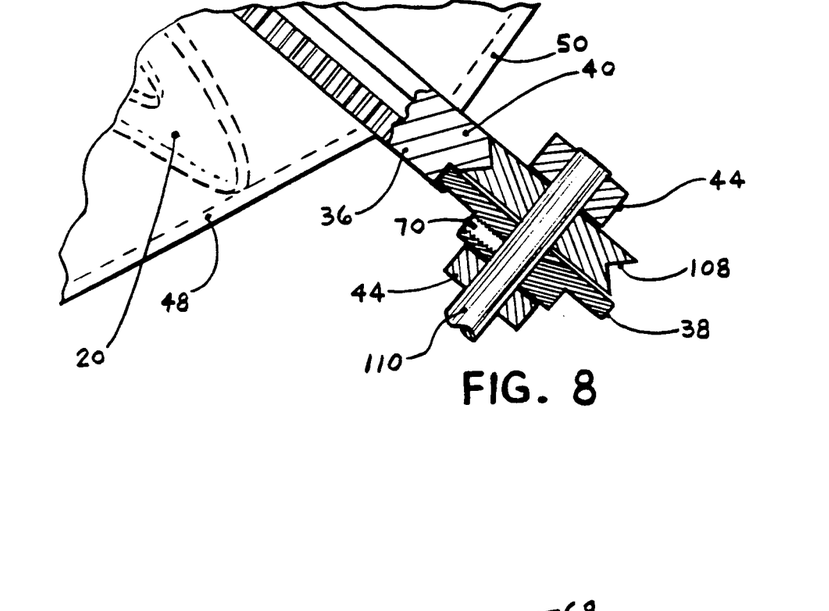
FIG. 8 shows a sectional view, taken in the direction of arrows B—B of such dispenser.
Figure 9:
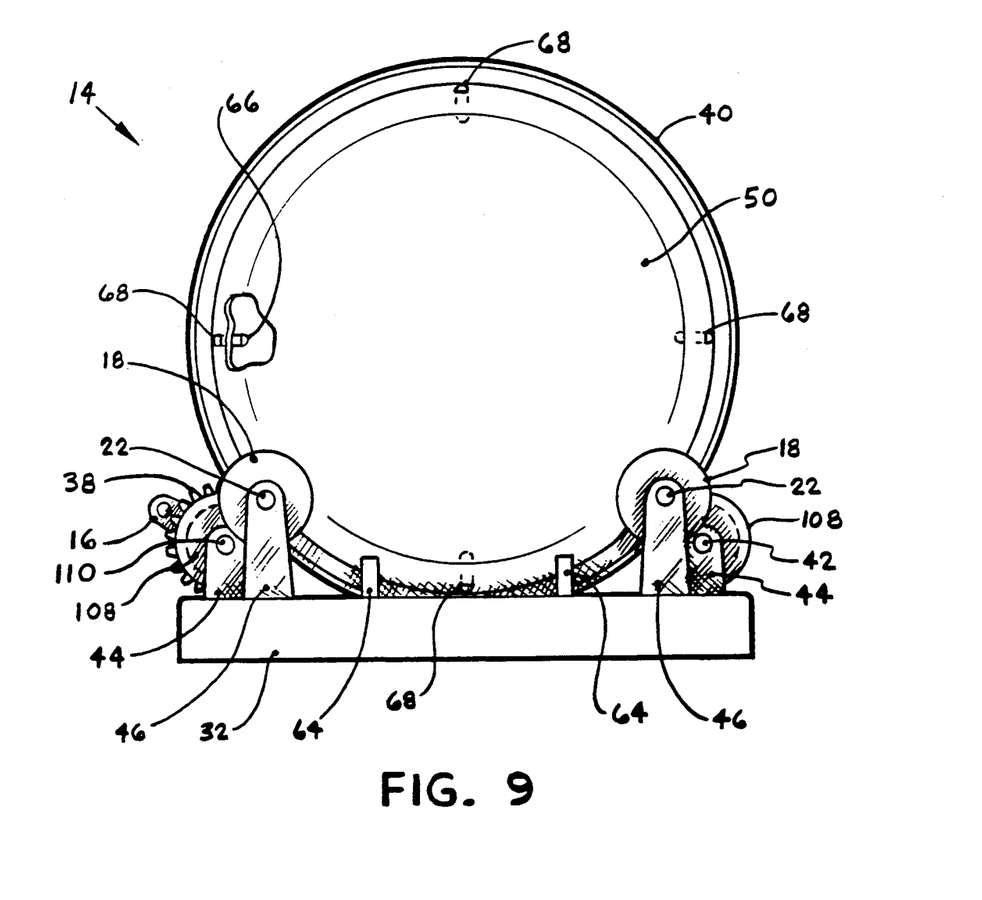
FIG. 9 shows a rear orthographic view of such dispenser.

Referring to FIG. 8, bearing wheel 108 serviceably controls the forward and rearward position of feed cone 48 and container 50 as they rotate or remain in a stationary position. Best seen in FIGS. 1, 4, 5, and 9, support wheel 18 provides operable rotative and supportive structure for container 50. Spur gear 38 is driven by shaft 110 and rotatably engaged to ring gear 36 on feed cone 48. A setscrew 70 secures spur gear 38 to shaft 110. Rotation of drive handle 16 causes shaft 110 to rotate via a locking pin 58. As handle 16 is rotated, the resulting torque is transmitted to locking pin 58, shaft 110, spur gear 38, and to ring gear 36, and thus simultaneously rotating feed cone 48 and container 50.

As shown in FIGS. 1, 2, 4, 5, and 6, measuring chamber 94 is a system of preferably closed transparent walls forming a chamber having an opening 106 at the bottom thereof, an entry opening 104 at the top rear thereof, two pivot pin holes 82 at the bottom rear thereof, and having integral support gussets 102 joined to a base plate 114 which has two generally elongate slots 100 which mate with studs 28. Essentially at the top of chamber 94 is a transparent viewing area 74 having an elongated slot 34 which encloses tag 76 on which product name, price, or other useful information is placed. Spring attachment bracket 62 for attachment of spring 60 is formed integrally with chamber 92 and is preferably located on a side of chamber 94.

The dispenser chute 112 is pivotally attached to measuring chamber 94 by pivot pins 24 secured in holes 82 and 80. Dispenser chute 112 is a system of walls and openings forming a product retaining floor 78, and exit opening 54, holes 80, and spring attachment bracket 56, best seen in FIGS. 3, and 4.

Figure 6:
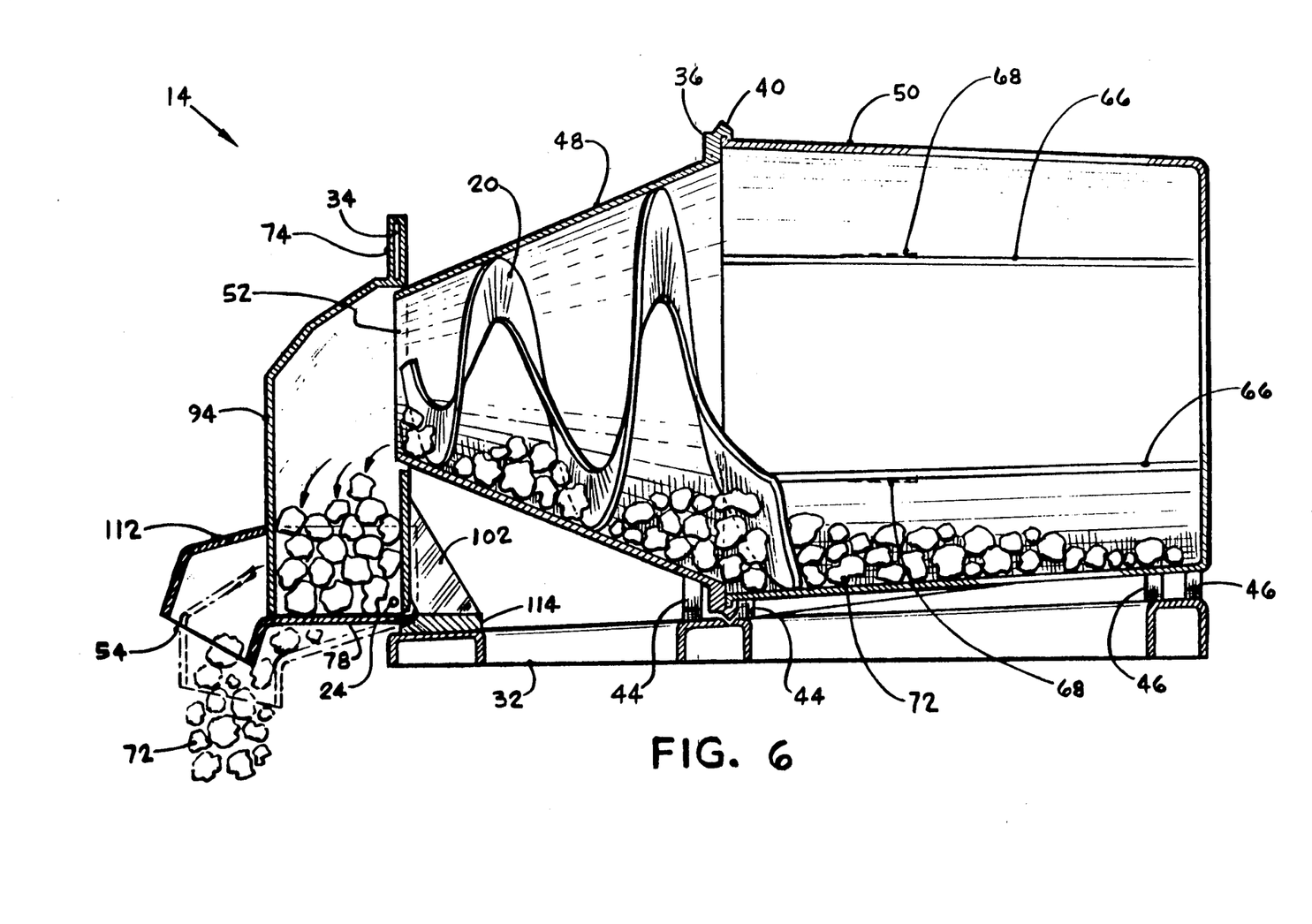
FIG. 6 shows a sectional view, taken in the direction of arrows A—A of such dispenser.

Referring to FIG. 6, floor 78 of dispenser chute 112 retains foodstuffs of other products in measuring chamber 94 in a normally upwardly closed position by means of spring 60. When dispenser chute 112 is pivoted downward by overcoming the retaining force of spring 60 floor 78 is rearwardly retracted allowing products 72 to pass out exit opening 54.

Figure 5:
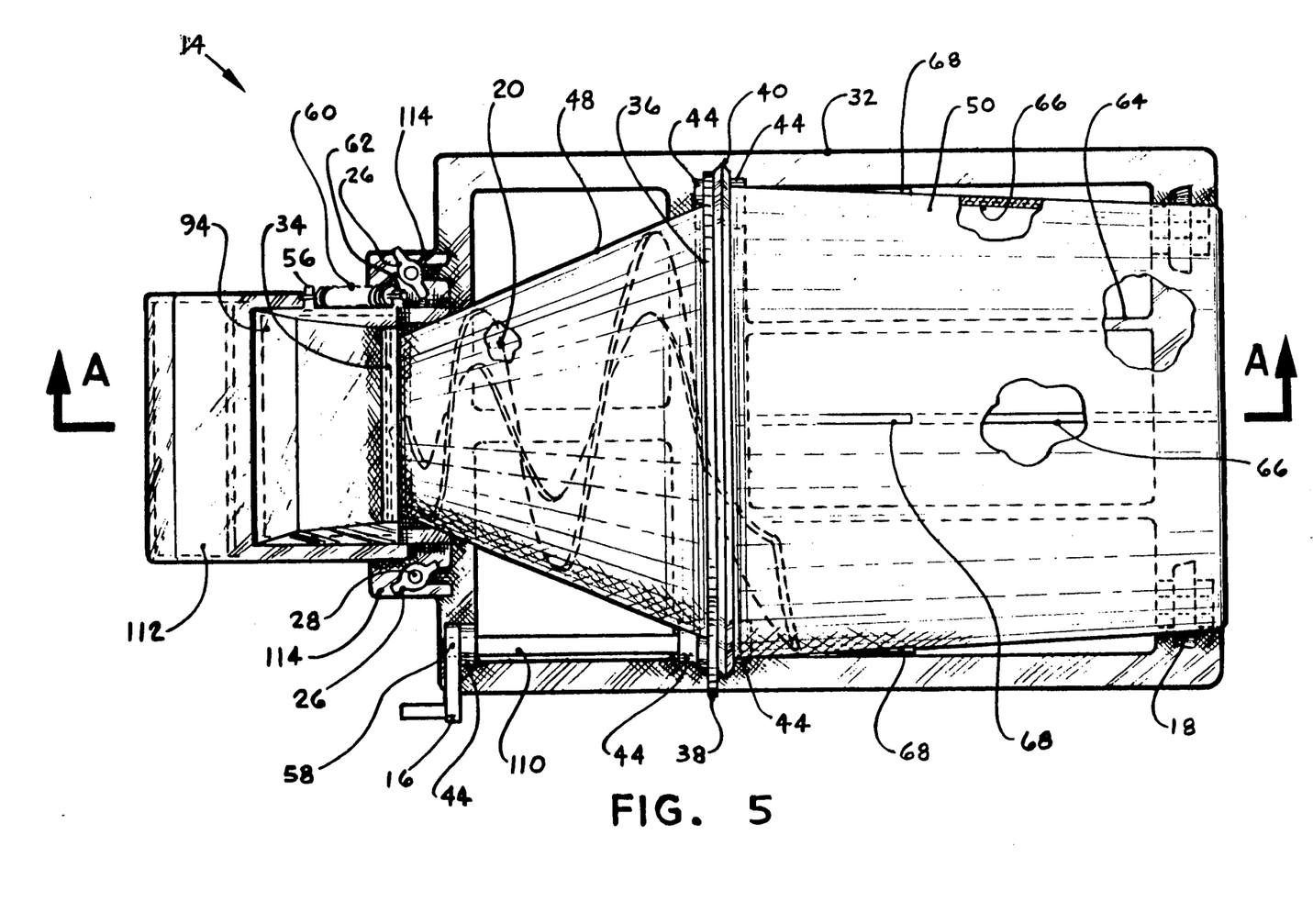
FIG. 5 shows a top orthographic view of such dispenser.

Support base 32 is a system of surfaces as shown in FIGS. 1, 4, 5, 6, and 9, having substantially elongated longitudinal supports 64, best seen in FIG. 5. Shafts 22, 42, and 110 are, in the preferred embodiment, slip-fitted into shaft supports 44 and 46 respectively. Bearing wheels 108 and support wheels 18 are preferably pressfitted to their respective shafts.

Figure 7:
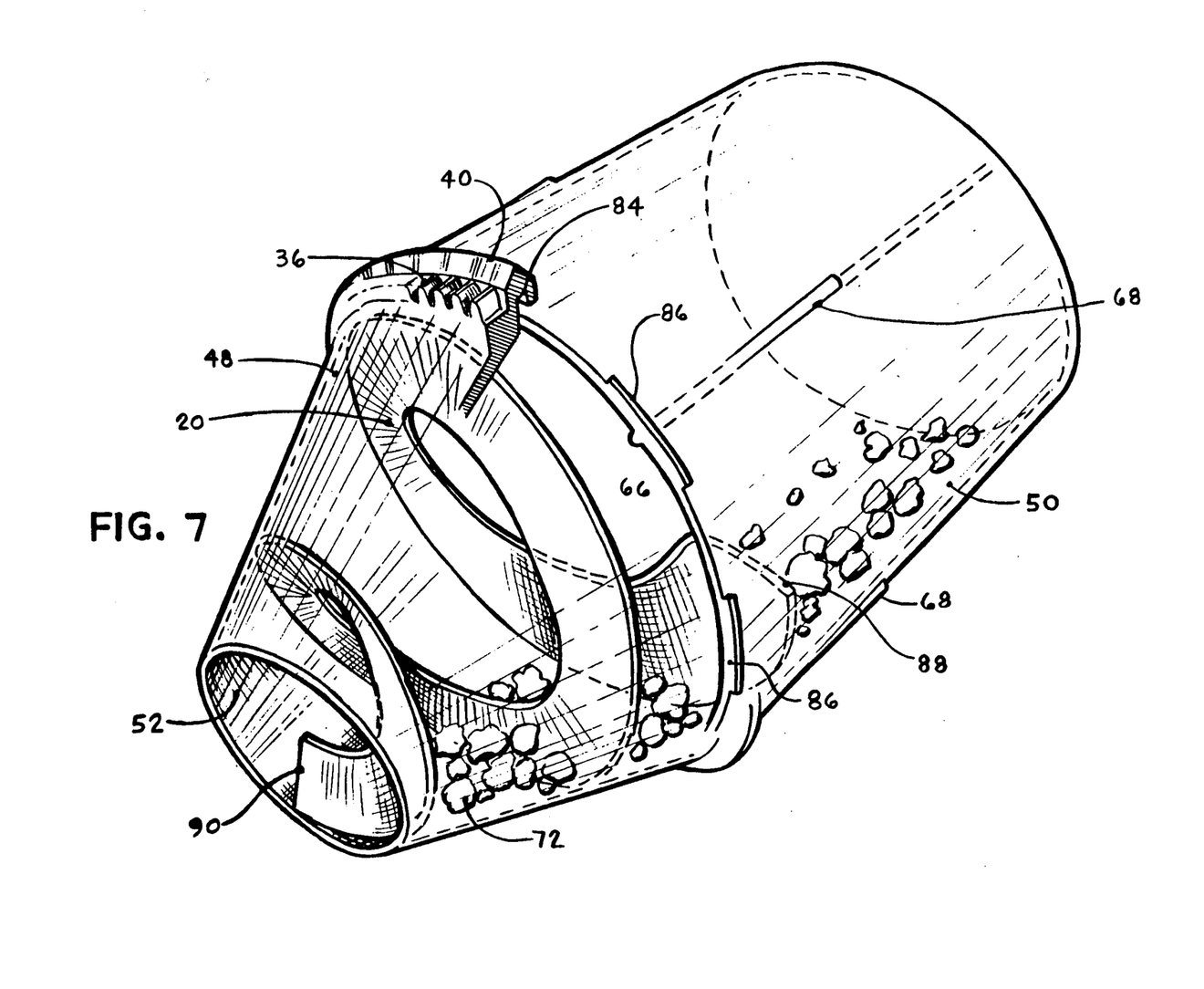
FIG. 7 shows a perspective, right front view of the feed cone and container of such dispenser.

FIG. 7 illustrates the locking structure provide by slot 84 in feed cone 48 and tabs 86 on container 50, according to the preferred embodiment of the invention. In use, container cover 30 is removed from container 50 by turning cover 30 counterclockwise approximately one-eight of a turn and lifting the cover 30 from container 50. Feed cone 48 is operably engaged with pail 50 by tab 86 operatively entering slot 92 on feed cone 48. Rotating feed cone 48 clockwise approximately one-eighth of a turn allows tab 86 to enter locking slot 84 in feed cone 48. A preferred structure for locking is provided by a gradual locking taper of tab 86. Product container 50 is used as a container to store and ship products in a safe and sanitary manner, as well as the dispensing container. The container 50 and cover 30 are preferably composed of completely recyclable material to reduce environmental impact.

Figures 10, 11, 12:
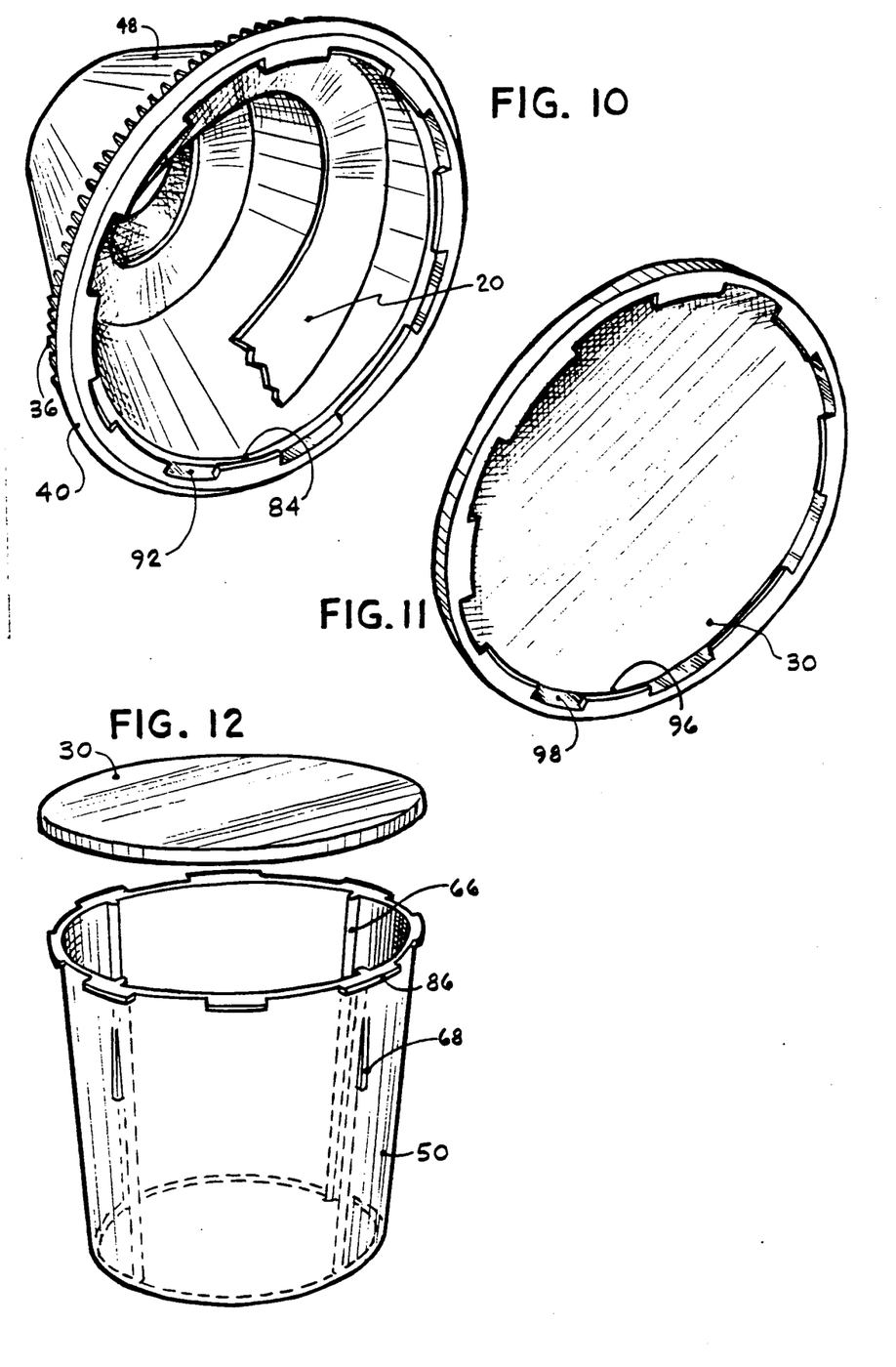
FIG. 10 shows a right rear perspective view of a feed cone of such dispenser.
FIG. 11 shows a bottom perspective view of a container cover of such dispenser.
FIG. 12 shows a perspective view of the container and container cover of such dispenser.

As shown in FIG. 10, spiral auger blade 20 is preferably integral with feed cone 48, but may be otherwise. Likewise, ring gear 36, ring bearing 40, slots 84 and 92, are in the preferred embodiment, integrally formed with feed cone 48.

In operation and use the sanitary dispenser 14 of the invention is easy to disassemble, clean, resupply, and reassemble. Base 32 is easily removed by simply lifting upwards and rearward, and is replaced by lowering it onto the support wheels 18 and bearing wheels 108. Container 50 and feed cone 48 are aligned and secured together locking slot 84 in feed cone 48 with tabs 86 on pail 50. Measuring chamber 94 is removed from feed cone 48 by disengaging entry opening 104 from exit end 52 of feed cone 48. If desired, the container 50 and feed cone 48 may be removed by loosening thumbscrews 26 and then lifting the container and feed cone away from base 32. Replacement with a replenished container is accomplished by placeing the new container on base 32 and securing it thereto.

While the above description contains many specificities, these should not be construed as limitations on the scope of the invention, but merely as exemplifications of preferred embodiments thereof. Those skilled in the art will envision many other possible variations are within its scope. For example, skilled artisans will readily be able to change the dimensions and shapes of the various embodiments. They will also be able to make the dispenser out of alternative materials, such as thermo-plastic or thermo-setting resins. Various shape and configurations of the container and measuring chamber are contemplated herein, as are various base configurations and attachments. Accordingly, it is intended that the following appended claims be interpreted as including all such alterations, permutations and modifications as fall within the true spirit and scope of the present invention.

We claim:

1. A sanitary dispenser for dispensing a measured quantity of foodstuff comprising:
   a base,
   drive assembly means for rotating a container is secured to said base, said container to be at least partially filled with a preselected quantity of foodstuffs and having a plurality of elongated internal ribs and a plurality of external locking tabs integral with the container and said container being removeably mounted to said drive assembly means,
   a feed cone having a spiral auger blade disposed therein and being detachably secured to said container, said spiral auger blade extends into said container when said feed cone is secured thereto so that the spiral auger blade is continuously exposed to the foodstuffs contained in the container,
   measuring means, being detachably secured to said feed cone means and to said base, having a system of walls forming a chamber having a bottom opening, and an exit opening, and
   dispensing means, moveably mounted on said measuring chamber means, for dispensing a measured quantity of foodstuff from said measuring chamber means.

2. The sanitary dispenser of claim 1 wherein said feed cone has a ring gear for rotational engagement with said drive assembly means.

3. The sanitary dispenser of claim 2 wherein said measuring means comprises an entry opening and a plurality of integral support gussets joined to a base plate having two generally elongated slots therein for mounting on said base.

4. The sanitary dispenser of claim 2 wherein said dispensing means comprises a dispenser chute comprised of system of walls and openings having a spring attachment bracket, a spring operably engaged to said bracket, and a pivotable retaining floor serviceably linked to said spring.

5. The sanitary dispenser of claim 2 wherein said drive assembly means comprises a plurality of support wheels, a plurality of bearing wheels serviceably linked to a drive handle and to said feed cone, so that rotation of said drive handle transmits rotational energy to said feed cone, thereby simultaneously rotating the feed cone and said container.

6. The sanitary dispenser of claim 3 wherein said measuring chamber further comprises a horizontally disposed indicia means on said measuring chamber.

7. The sanitary dispenser of claim 6 wherein said measuring chamber has a horizontal slot defined thereon and wherein said indicia means comprises a product information tag.

8. The sanitary dispenser of claim 2 wherein said measuring chamber means and said dispensing means are incorporated into a modular measuring chamber and dispensing assembly secured to said feed cone.

9. The sanitary dispenser of claim 2 wherein said container further comprises a detachable cover.

10. The sanitary dispenser of claim 5 wherein said drive assembly further comprises a plurality of shafts serviceably linked to said plurality of support wheels and said plurality of bearing wheels are operably secured within a plurality of support shafts secured to said base.

11. The sanitary dispenser of claim 2 wherein said feed cone and said spiral auger blade comprise a one piece molded structure.

12. A dispenser for dispensing a measured quantity of product, comprising:
   a base,
   drive assembly means for rotating a container operably mounted on said base, the container is adapted to be serviceably mounted onto said drive assembly means and is detachably secured to a feed cone having an auger blade disposed therethrough and extending into said container so that when said container and said feed cone are secured together said auger blade extends into said container,
   measuring means removeably mounted on said feed cone for receiving a measured quantity of product when said feed cone is rotated, and
   dispensing means moveably secured onto said measuring means for dispensing a measured quantity of product therefrom.

13. The dispenser of claim 12 wherein said feed cone has a ring gear for rotational engagement with said drive assembly means.

14. The dispenser of claim 13 wherein said measuring means comprises a system of walls forming a measuring chamber having a bottom opening, an entry opening, and mounting means to secure said measuring chamber to said base.

15. The dispenser of claim 14 wherein said mounting means comprise a plurality of integral support gussets joined to a base plate having two generally elongated slots therein for mounting said measuring chamber onto said base.

16. The dispenser of claim 13 wherein said dispensing means comprises a dispenser chute comprised of a system of walls and openings having a spring attachment bracket secured thereto, a spring operably engaged to said bracket, and a moveable retaining floor serviceably linked to said spring.

17. The dispenser of claim 13 wherein said drive assembly means comprises a plurality of support wheels, a plurality of bearing wheels serviceably linked to a drive handle and to said feed cone, so that rotation of said drive handle rotates said feed cone, thereby simultaneously rotating said feed cone and said container.

18. The dispenser of claim 14 wherein said measuring chamber further comprises a horizontally disposed indicia means on said measuring chamber.

19. The dispenser of claim 18 wherein said measuring chamber has a horizontal slot defined thereon wherein said indicia means comprises a product information tag.

20. The dispenser of claim 13 wherein said measuring chamber means and said dispensing means are incorporated into a modular measuring chamber and dispensing assembly secured to said feed cone.

21. The dispenser of claim 12 wherein said container further comprises a detachable cover.

22. The sanitary dispenser of claim 17 wherein said drive assembly further comprises a plurality of shafts serviceably linked to said plurality of support wheels and said plurality of drive wheels and operably secured within a plurality of support shafts secured to said base.

23. The sanitary dispenser of claim 13 wherein said feed cone and said auger blade comprise a one piece molded structure.

24. A sanitary dispenser for dispensing a measured quantity of consumer products, comprising:
a base,
a handle operably mounted on said base,
actuating means for supporting and rotating a closed container, said container defining a chamber adapted to be at least partially filled with said consumer product and being removeably and operably secured to said actuating means,
a measuring chamber means mounted on said container for receiving said measured quantity of consumer products from said chamber when the container is rotated,
feed cone means being detachably fastened to said container and having an auger blade disposed therethrough and extending into said container and is serviceably exposed to said consumer products in said container for selectively filling said measuring chamber means with a measured quantity of consumer product in response to rotation of said handle means,
dispensing means for dispensing said quantity of consumer products from said measuring chamber means.

25. A sanitary dispenser for dispensing a measured quantity of solid foodstuff or other consumer product, comprising:
a base,
a handle operably secured to said base,
drive assembly means for rotating a container serviceably mounted on said base, said container to be at least partially filled with a preselected quantity of solid foodstuffs or other consumer product and having a plurality of elongated internal ribs and a plurality of external locking tabs, and being removeably secured to said drive assembly means,
a feed cone having an auger blade disposed therein and being detachably secured to said container, said auger blade extends into said container when said feed cone is secured to said container said auger blade is continuously exposed to the foodstuffs or other consumer product contained in the container,
measuring means communicatively linked to said feed cone having a system of walls forming a chamber having a bottom opening and an exit opening, and
dispensing means for dispensing said measured quantity of solid foodstuffs or consumer products from said measuring means.

26. The dispenser of claim 25 wherein said feed cone has a ring gear for rotational engagement with said drive assembly means so that when said drive assembly is rotated, rotational energy is transmitted to said feed cone thereby simultaneously rotating said feed cone and said container.

27. The dispenser of claim 26 wherein said measuring means comprises an entry opening and a plurality of integral support gussets joined to a base plate having two generally elongated slots therein for mounting said measuring chamber on said base.

28. The dispenser of claim 26 wherein said dispensing means comprises a dispenser chute comprised of a system of walls and openings having a spring attachment bracket, a spring operably engaged to said bracket, and a pivotable retaining floor serviceably linked to said spring.

29. The dispenser of claim 27 wherein said measuring chamber further comprises a horizontally disposed indicia means on said measuring chamber.

30. The dispenser of claim 29 wherein said measuring chamber has a horizontal slot defined thereon and wherein said indicia means comprises a product information tape.

31. The dispenser of claim 25 wherein said measuring chamber means and said dispensing means are incorporated into a modular measuring chamber and dispensing assembly secured to said feed cone.

32. The dispenser of claim 26 wherein said container further comprises a detachable cover.

33. The dispenser of claim 25 wherein said drive assembly further comprises a plurality of shafts serviceably linked to a plurality of support wheels and operably secured within a plurality of support shafts secured to said base.

34. The dispenser of claim 26 wherein said feed cone and said auger blade comprise a one piece molded structure.

* * * * *